July 16, 1940.  H. T. MALLEY  2,208,220
HYDRAULIC BRAKE CONTROL
Filed Nov. 2, 1938  2 Sheets-Sheet 1
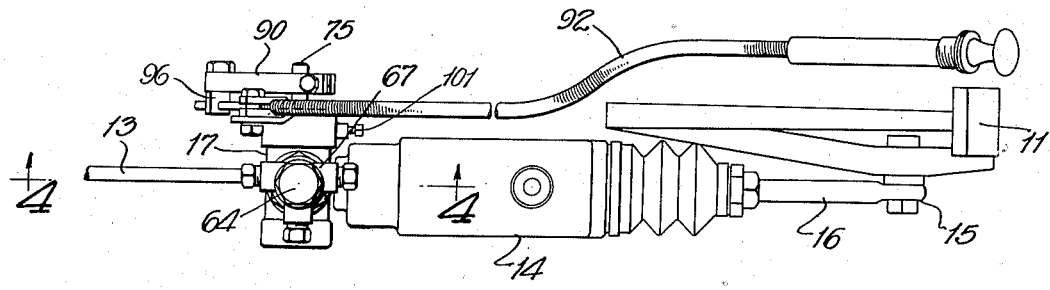
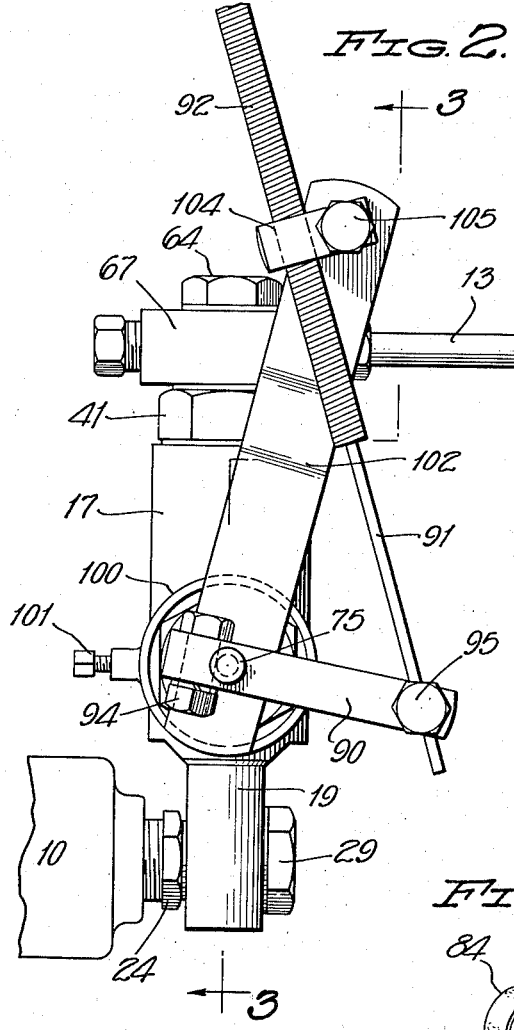
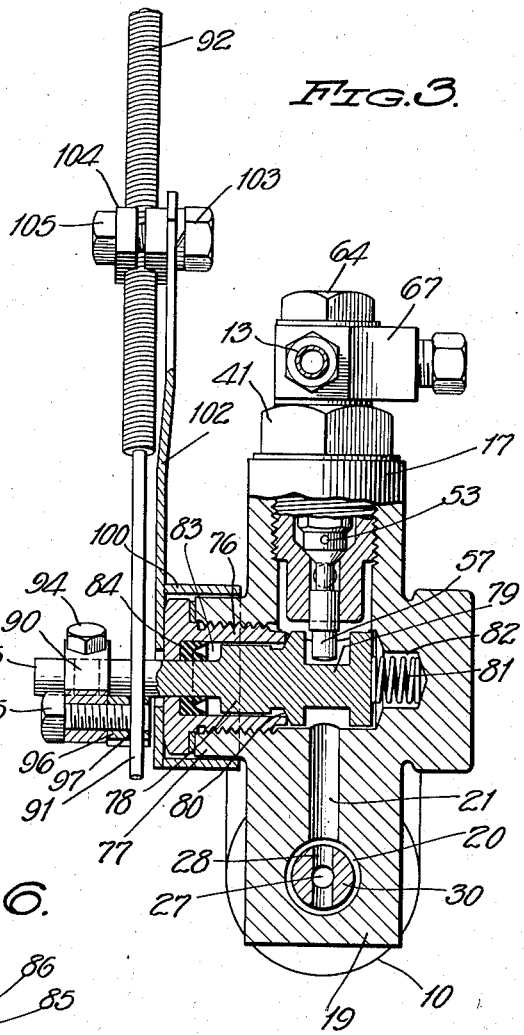
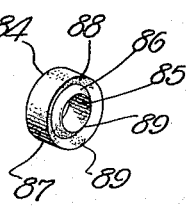
HARRY T. MALLEY.
INVENTOR
BY *Ely Pattison*
ATTORNEYS
WITNESS:

July 16, 1940. H. T. MALLEY 2,208,220
HYDRAULIC BRAKE CONTROL
Filed Nov. 2, 1938 2 Sheets-Sheet 2
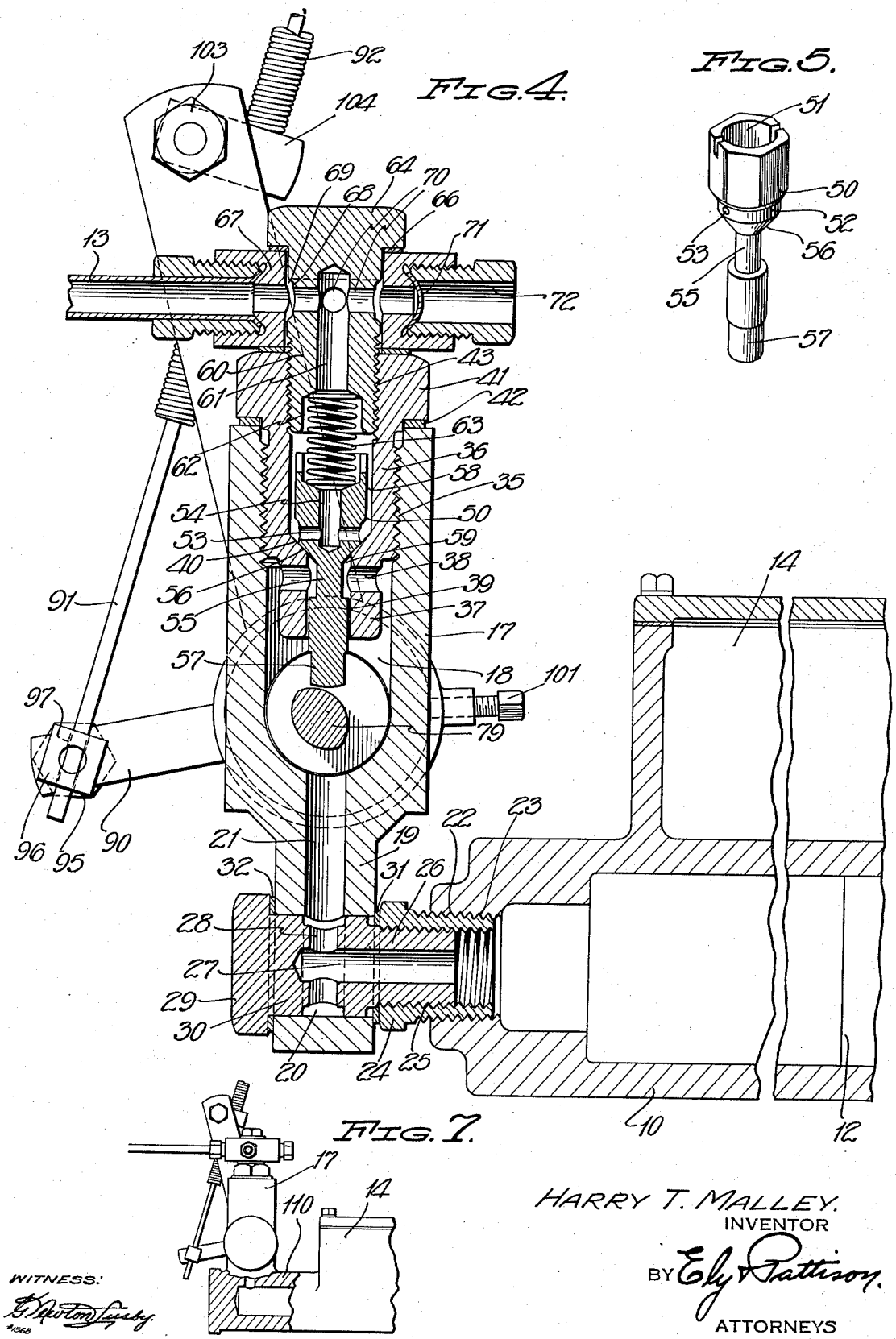
HARRY T. MALLEY.
INVENTOR
BY Ely Pattison
ATTORNEYS
WITNESS:

Patented July 16, 1940

2,208,220

UNITED STATES PATENT OFFICE 2,208,220

HYDRAULIC BRAKE CONTROL

Harry T. Malley, Greensburg, Pa.

Application November 2, 1938, Serial No. 238,321

5 Claims. (Cl. 188—265)

This invention relates to improvements in braking systems and more particularly it pertains to brake systems of the hydraulic type.

One object of the invention is to improve the construction and mode of operation of hydraulic brake systems of the general type employed upon vehicles and more particularly, the hydraulic brake systems employed upon motor vehicles.

A feature of the present invention resides in the provision of a novel construction and arrangement of parts for use in combination with hydraulic brake systems, whereby the brake systems of ordinary or conventional type may be increased in their efficiency.

A further feature of the invention resides in a novel construction whereby the brake system of a vehicle may be utilized as a means for locking the vehicles, thereby preventing unauthorized operation or movement of the same.

Still a further feature of the invention resides in a novel construction by which a vehicle equipped with a device constructed in accordance with the present invention may be held against rolling movement either in a forward or rearward direction when parked upon steeply inclined roadways.

Still a further feature of the invention resides in the provision of means of the afore-mentioned character which is in the nature of an attachment to existing hydraulic brake systems of conventional form although it is also capable of incorporation as a permanent part of such a braking system.

Still a further feature of the invention resides in a novel construction and arrangement of parts whereby, the device may be incorporated in a brake system, without necessity of alteration of any of the parts of the system, thus leaving the system capable of being again hooked-up in the conventional manner after the device has been removed.

It is a still further feature of the invention, so to construct the device that even though it is incorporated in a brake system, its use is not compulsory and it may be cut into and out of operation at the will of the operator without in any manner impairing the operation of the brake system in which it may be incorporated.

Other features of the invention relate to certain novel and improved constructions, arrangements and combinations of parts hereinafter described and particularly pointed out in the claims, the advantages of which will be readily understood and appreciated by those skilled in the art.

The invention will be clearly understood from the accompanying drawings illustrating the invention its its preferred form and the following detailed description of the constructions therein shown.

In the drawings,

Figure 1 is a top plan view illustrating the master cylinder, brake pedal and brake lines of a conventional type of hydraulic brake system, Figure 2 is a fragmentary view in elevation illustrating a portion of said system, Figure 3 is a vertical sectional view taken substantially on the line 3—3 of Figure 2, Figure 4 is an enlarged vertical sectional view taken substantially one the line 4—4 of Figure 1, with certain of the parts broken away, Figure 5 is a detail perspective view of the valve element of the device, Figure 6 is a detail perspective view of a packing or sealing element employed, and;

Figure 7 is a detail fragmentary sectional view on a reduced scale illustrating a modified form of the invention.

Referring particularly to Figure 4 of the drawings, the reference numeral 10 designates the master cylinder of the hydraulic brake system. Movable in this cylinder by means of the brake pedal 11, as shown in Figure 1, there is a piston 12 which forces fluid from the master cylinder 10 under pressure to the brake line or lines of which one is designated 13 in Figure 1. The fluid is supplied to the master cylinder 10 from a reservoir 14 and so far as described, the construction is of more or less conventional type.

The device of the present invention consists of a unit to be interposed between the master cylinder 10 and the brake line or lines 13 for the purpose of maintaining the fluid under pressure in the brake line or lines 13 after it has been forced therethrough by the piston of the master cylinder, it being understood that movement of the piston 10 forces the fluid to the brake line or lines 13 upon operation of the brake pedal 11 to effect a braking operation. Operation of the piston through the medium of the brake pedal 11 is effected by pivotal connection of the brake pedal as at 15 with the piston rod 16 of the piston 12, see Figure 1.

The unit comprises an elongated member 17 preferably of cylindrical form and which is hollow to provide a fluid receiving chamber 18. Extending from one end of the fluid receiving chamber 18, there is an extension 19 which, as best illustrated in Figure 3, is of rectangular form. This extension 19 has an opening 20 therethrough and establishes communication between the opening 20, and the fluid chamber 18, through a passage 21 which extends through the extension 19.

In interposing this unit in the brake system, the brake line or lines which are, in the conventional system connected directly to the master cylinder at the point designated 22, are removed and the unit attached to the master cylinder at this point in the following manner.

The master cylinder has an internally threaded passage 23 and threaded therein, there is a sleeve-like member 24 which is internally threaded as at 25. Threaded into the sleeve member 24, there is a plug 26 which has a passage 27 therethrough and radial ports 28 which establish communication between the passage 27 and the opening 20 of the extension 19. The plug 26 has a head 29 and an enlarged portion 30 of a diameter which snugly fits within the opening 20 of the extension 19. Interposed between the extension 19 and the sleeve 24, there is a packing or washer 31 and interposed between the head 29 and the extension 19, there is a packing or washer 32.

All of the aforementioned construction is clearly illustrated in Figure 4 and by reference to said figure, it will be apparent that as the plug 30 is screwed home, the extension 19 will be firmly clamped between the end of the sleeve 24 and the head 29 of the plug member 30 to provide for the rigid attachment of the fluid receiving chamber directly upon the end of the master cylinder 10. It is preferable to attach the fluid receiving chamber 18 to the master cylinder 10 in an upright or vertical position, but it may be attached at angles to the vertical if desired without impairing the operation thereof.

The fluid receiving chamber 18 has an open end which is internally threaded as at 35 and threaded into said open end there is a sleeve 36 which has a reduced extension 37 projecting from the inner end thereof. This extension 37 is provided with radial ports 38 which establish communication between the interior of the sleeve and the interior of the fluid receiving chamber 18 and the extension 37 is provided with a passage 39 extending from the ports 38 through the inner end of the extension 37, the purpose of which construction will be hereinafter described. The reference numeral 40 designates an annular valve seat upon the interior of the sleeve 36 at a point preferably just to the rear of the ports 38 and at an inner end of the passage 39 through the extension 37 of the sleeve 36. The sleeve 36 is provided with a head 41 and when in position in the fluid receiving chamber 18, this head serves to compress a packing or washer 32 between itself and the end of the fluid receiving chamber to form a fluid-tight joint between the sleeve and the open end of the fluid receiving chamber. Extending through the head 41, there is an internally threaded passage 43, the purpose of which will be hereinafter described.

In Figure 5, there is illustrated a valve member which is adapted for sliding movement within the sleeve 36 for engagement or disengagement with the valve seat 40, heretofore mentioned, to close or open, depending upon its position relative to the valve seat 40, the passage through the sleeve 36. This valve comprises a main body portion 40 having a cupped end 51. A reduced portion 52 is provided with radial ports 53 which provide communication between the interior of the sleeve 36 and the passage 54 which extends through the main body portion 50 of the valve. At a point beyond the ports 53, the valve is provided with a reduced portion 55 which provides a seat 56 upon the valve member for engagement with the valve seat 40 as shown in Figure 4. These two seats 40 and 56 are preferably ground in order that a perfect sealing engagement thereof may be had. Projecting from the extension 55, there is a slightly enlarged extension 57 which extends through the passage 39 in the extension 37 of the sleeve 36, this passage providing a guide for the valve member to insure axial alinement thereof, in the sleeve member 36. The main body portion 50 of the valve member is preferably of hexagonal form and its largest transverse dimension is less than the interior transverse dimension of the sleeve 36. This construction provides a space 58 between the valve and the inner face of the sleeve 36 to permit a free passage of fluid around the valve while the reduced portion 55 provides a space 59 to permit of free flow of fluid around the extension of the valve when the valve is in unseated position.

Threaded into the head 41 of the sleeve 36 there is a plug 60 which has a passage 61 therethrough, the inner end of which is enlarged as at 62. Interposed between the plug 60 and the valve heretofore mentioned, there is a coil spring 63 one end of which is received in the cupped end 51 of the valve, the other end being received in the enlarged portion 62 of the passage 61 of the plug 60. The plug 60 has a head 64 and this head serves to compress a packing or washer 66 between itself and a fitting 67. The plug 60 in addition to closing the outer end of the sleeve 36 serves to retain the fitting 67, to be hereinafter described, in operative position. The plug 60 is provided with a reduced portion 68 which provides an annular space 69, and establishing communication between the annular space 69 and the passage 61, there is a plurality of radially extending ports 70.

The fitting 67, as best illustrated in Figure 1, is in the form of a T-coupling to which the brake line or lines are intended to be connected and from which they receive the fluid and carry it to the various braking stations. In the present embodiment of the invention, provision is made for attachment to a system including three distributing brake lines. However, one or two may not be employed and in such cases those not employed may be closed, or cut off by a disk or similar seal 71 which is retained in sealing or closing position by a plug or the like 72 as illustrated in Figure 4.

Extending through the fluid receiving chamber 18 and projecting to the exterior thereof, there is a shaft 75 see Figure 3. This shaft passes through a sleeve 76 having threaded engagement with the interior of an extension 77 projecting from the side of the unit 17 as shown in Figure 3. The shaft has an enlarged portion 78 which has a bearing fit with the interior of the sleeve 76 and upon its inner end the shaft 75 is provided with a cam 79.

The aforementioned parts are so arranged that upon rotation of the shaft, the effective surface of the cam 79 will engage the extension 57 of the valve to effect an unseating thereof, the valve being normally held to its seat by the pressure of the coil spring 63 in which position it is shown in Figure 4.

The enlarged portion 78 of the shaft 75 has an annular shoulder 80 which engages the inner end of the sleeve 76 as shown in Figure 3 and the shaft is maintained in this position by the pressure of a coil spring 81 interposed between the inner end of the shaft and the inner wall of a recess 82 in the member 17. The enlarged portion 78 of the shaft is shorter than the sleeve 76 which construction provides a chamber 83 for the reception of a sealing element 84 for sealing the joint between the shaft 75 and the walls of the passage of the sleeve 76, through which the shaft extends.

This sealing element 84 is shown in detail in Figure 6 and comprises a circular member having passage 85 therethrough for the reception of the shaft 75. This member is constructed to provide an inner wall 86, an outer wall 87 and an intervening annular space 88. The edges 89 of the walls 86 and 87 are of the type commonly termed "feather edges" and said walls are relatively thin. This device is formed of soft pliable rubber and so arranged that pressure under fluid will enter the annular space 88 and will force the walls 86 and 87 into sealing engagement with their respective parts, namely, the shaft 75 and the sleeve 76.

The shaft 75 is adapted to be operated from a point adjacent the driver's seat and to provide for this, the shaft has a crank arm 90 secured thereto by a bolt 94. A flexible wire 91 enclosed in a tube or coil 92 which extends from its point of connection with the arm 90, to any desired point of operation, is attached to the free end of the arm 90 by a block 96. The block 96 is threaded upon a set-screw or bolt 95 and has a passage 97 through which the wire 91 passes. The inner free end of the set-screw or bolt 95 engages the wire 91 and retains the same in the opening 97 in the block 96 as best illustrated in Figure 3.

Surrounding the extension 77 there is a ring-like member 100 which is secured against movement relative to the extension by a set-screw or the like 101. Rigidly carried by the ring-like member 100, there is an arm 102 and secured to the free end of the arm by a bolt or the like 103, there is a bracket 104 through which the tube or coil 92 extends and in which it is clamped by means of a bolt or the like 105. By this construction loosening of the set-screw 101 permits of adjustment of the ring 100 and the arm 102 in order that the pulling strain of the wire 91 upon the arm 90 may be exerted in the most efficient manner.

The device operates in the following manner: With the parts in the position illustrated in Figure 4, it is understood that the reservoir 14, the master cylinder 10, the unit 17 and the break lines are filled with fluid in the usual manner and that in said position of the parts, the fluid is at rest.

Upon operation of the brake pedal 11, the piston in the master cylinder is moved to the left in said Figure 4 and places the fluid under pressure beyond the piston. Placing the fluid under pressure moves the seat 56 of the valve out of engagement with the seat 40 and permits of the free movement of the fluid through the entire system to effect a braking operation. Upon release of pressure upon the brake pedal 11, it returns to its normal position and retracts the piston in the master cylinder to its normal position of rest. However, when the pressure is relieved upon the brake pedal 11, the seat 56 of the valve under the influence of the pressure in the brake line or lines beyond the valve and the influence of the spring 63 is moved into engagement with the seat 40 and the fluid beyond the valve is trapped under pressure in the brake lines maintaining the brake in applied position. The brakes are maintained in applied position by the trapped fluid until the fluid is released and this is accomplished in the following manner.

To release the trapped fluid, a pull is exerted upon the wire 91, rocking the shaft 75 and moving the effective portion of the cam 79 into engagement with the extension 57 of the valve to unseat the same and permit the trapped fluid under pressure to expand into that part of the system between the valve and the master cylinder of the system permitting the parts to return again to the normal position.

In addition to maintaining the brakes in locked position, it has been found in actual practice that the present invention provides for increasing, beyond normal, the braking pressure of any standard braking system and this is accomplished in the following manner.

With the parts at rest as shown in Figure 4, operation of the piston in the master cylinder forces the fluid under pressure to the brake lines where it is trapped and maintained under pressure beyond the valve as heretofore described. However, if the piston in the master cylinder be again operated, additional fluid is passed beyond the valve, increasing the pressure in the brake line and consequently increasing the applied force at the braking stations. This is accomplished by increasing the leverage between the brake pedal and the piston of the master cylinder over and above the normal leverage employed in conventional systems.

The increasing of the braking force as above described has been found particularly advantageous in the holding of vehicles which are heavily loaded, for example, trucks upon inclined roadways and it is to be noted that the device is effective to prevent a heavily loaded truck from rolling either forwardly or backwardly upon an inclined roadway.

While it has been assumed in the foregoing description that the unit is continually in use during a braking operation, it is to be understood that the unit may be thrown completely out of operation and this phase of the invention will now be described.

If the cam 79 be moved to position where it will maintain the valve at all times unseated, it will be obvious that the fluid in the braking system may pass freely through the fluid receiving chamber 18 and the brakes operated in the same manner as conventional fluid braking systems, without a trapping of the fluid and with only the ordinary braking action resulting.

The modification shown in Fgure 7 is substantially the same as heretofore described except that in said figure the reservoir 14 is provided with an integral extension 110 and the unit 17 formed as an integral part thereof. This construction is particularly adaptable to installations wherein the unit forms a portion of the regular equipment rather than an attachment to a fluid braking system.

While the invention has been illustrated in a brake for motor vehicles, it is obvious that the principles thereof are readily applicable to hydraulic braking systems for any purpose and it is to be therefore understood that the invention is not to be limited to braking systems of motor vehicles.

Having thus described my invention, what I claim as new is:

1. In combination with a hydraulic brake system, means for holding the fluid under pressure within the brake lines when the same has been forced thereto to effect a braking application, said means comprising a fluid receiving chamber, means for attaching said chamber to the master cylinder of the hydraulic brake system and for establishing communication between the master cylinder and the fluid receiving chamber, an externally threaded sleeve extending into said fluid receiving chamber, a reduced extension projecting from the inner end of the externally threaded sleeve, said extension having ports establishing communication between the interior of the sleeve and the fluid receiving chamber, a valve seat within said sleeve, a valve movable into and out of engagement with said valve seat, means for holding said valve normally in engagement with said seat and permitting of unseating of the valve under pressure of fluid within the fluid receiving chamber and separate means for maintaining said valve unseated to permit of free passage of fluid through the fluid receiving chamber and the sleeve to the brake lines of the brake system.

2. A device for retaining under pressure the fluid in the brake lines of a hydraulic brake system when the same has been forced thereto under pressure to effect an application of the brakes, said device including a fluid receiving chamber interposed between the master cylinder and the brake lines of the system, means for connecting said fluid receiving chamber directly to the master cylinder of the brake system and providing communication between the master cylinder and the fluid receiving chamber, a threaded sleeve extending into said fluid receiving chamber, a reduced extension projecting from said sleeve, said extension having ports to establish communication between the fluid receiving chamber and the interior of the sleeve, a valve seat within said sleeve, a valve within the sleeve for engagement with the seat to prevent the flow of fluid through the fluid receiving chamber in a reverse direction, yet permitting of the free flow of fluid from the fluid chamber to the brake lines of the system under pressure, resilient means normally to retain the valve in engagement with said seat, and means for maintaining said valve out of engagement with the seat to permit free flow of fluid in either direction through the sleeve and fluid receiving chamber.

3. A device for retaining the fluid under pressure in the brake lines of a hydraulic brake system when the same has been forced thereto under pressure to effect an application of the brakes, said means including a fluid receiving chamber of elongated form, an extension projecting from one end of the fluid receiving chamber, said extension providing means for attachment of the fluid receiving chamber to the master cylinder of a hydraulic brake system, said attaching means having a passage therethrough whereby to establish communication between the master cylinder and the fluid receiving chamber, an externally threaded sleeve for threaded engagement in the opposite end of the fluid receiving chamber, the interior of said sleeve having communication with the fluid receiving chamber, a valve seat interiorly of said threaded sleeve, a valve for engagement with said seat, an extension projecting from said valve through the inner end of the threaded sleeve, means threaded into the outer end of the threaded sleeve to close the same and for establishing communication between the interior thereof and the brake lines of the brake system, means for holding the valve normally to its seat and permitting unseating thereof under pressure of the fluid passing from the fluid receiving chamber to the brake lines of the braking system, and manually operated means for maintaining said valve in unseated relation with its seat to permit of free flow in either direction of fluid between the master cylinder and the brake lines of the brake system.

4. A device for retaining the fluid under pressure in the brake lines of a hydraulic brake system when the same has been forced thereto under pressure to effect an application of the brakes, said means including a fluid receiving chamber of elongated form, an extension projecting from one end of the fluid receiving chamber, said extension providing means for attachment of the fluid receiving chamber to the master cylinder of a hydraulic brake system said attaching means having a passage therethrough whereby to establish communication between the master cylinder and the fluid receiving chamber, an externally threaded sleeve for threaded engagement in the opposite end of the fluid receiving chamber, the interior of said sleeve having communication with the fluid receiving chamber, a valve seat interiorly of said threaded sleeve, a valve for engagement with said seat, an extension projecting from said valve through the inner end of the threaded sleeve, means threaded into the outer end of the threaded sleeve to close the same and for establishing communication between the interior thereof and the brake lines of the brake system, means for holding the valve normally to its seat and permitting unseating thereof under pressure of the fluid passing from the fluid receiving chamber to the brake lines of the braking system, and manually operated means for maintaining said valve in unseated relation with its seat to permit of free flow in either direction of fluid between the master cylinder and the brake lines of the brake system, said last mentioned means including a shaft extending across the fluid receiving chamber and a cam carried by said shaft for engagement with the extension projecting from the valve when the shaft is rotated.

5. A device for retaining under pressure the fluid in the brake lines of a hydraulic brake system when the same has been forced thereto under pressure to effect an application of the brakes, said device comprising a unit for interposition in the brake system between the master cylinder and the brake lines thereof, and comprising a fluid chamber having communication with the master cylinder, a sleeve extending into the fluid chamber and having threaded engagement therewith, a reduced extension projecting from the inner end of said sleeve, said extension having radially extending ports for establishing communication between the interior of the sleeve and the interior of the fluid chamber, a valve seat within the sleeve, a valve slidably mounted in said sleeve for engagement with said valve seat to prevent the flow of fluid in a reverse direction through the sleeve to the fluid chamber, an extension projecting from said valve through the inner end of the sleeve into the fluid chamber, means for closing the outer end of the sleeve and for establishing communication between the interior of the sleeve and the brake lines of the brake system, a coil spring interposed between said last mentioned means and the valve and tending to move the valve into engagement with the seat, and means for moving the valve to open position and for holding it in said open position against the action of said spring.

HARRY T. MALLEY.